(12) United States Patent
Gunzelmann et al.

(10) Patent No.: US 7,469,004 B2
(45) Date of Patent: Dec. 23, 2008

(54) TRANSMITTING AND RECEIVING ARRANGEMENT FOR RADIOS HAVING A BASEBAND COMPONENT, A RADIO-FREQUENCY COMPONENT AND AN INTERFACE ARRANGED IN BETWEEN THEM

(75) Inventors: Bertram Gunzelmann, Königsbrunn (DE); Berndt Pilgram, München (DE); Dietmar Wenzel, Müchen (DE)

(73) Assignee: Infineon Technologies AG, Munich (DE)

( * ) Notice: Subject to any disclaimer, the term of this patent is extended or adjusted under 35 U.S.C. 154(b) by 641 days.

(21) Appl. No.: 10/794,297

(22) Filed: Mar. 5, 2004

(65) Prior Publication Data
US 2004/0228395 A1 Nov. 18, 2004

(30) Foreign Application Priority Data
Mar. 17, 2003 (DE) ................ 103 11 701

(51) Int. Cl.
*H04B 1/38* (2006.01)
(52) U.S. Cl. .................................. 375/219
(58) Field of Classification Search .......... 375/219, 375/220, 369; 455/550.1, 73
See application file for complete search history.

(56) References Cited

U.S. PATENT DOCUMENTS

| 6,377,782 | B1* | 4/2002 | Bishop et al. ............ 455/3.01 |
| 6,400,966 | B1 | 6/2002 | Andersson et al. |
| 2002/0132648 | A1* | 9/2002 | Kerth et al. ................ 455/570 |
| 2003/0064692 | A1* | 4/2003 | Shi ........................ 455/232.1 |
| 2004/0076127 | A1* | 4/2004 | Porte ......................... 370/328 |
| 2004/0204096 | A1* | 10/2004 | Hirsch et al. ................ 455/561 |
| 2005/0119025 | A1 | 6/2005 | Mohindra et al. |

FOREIGN PATENT DOCUMENTS

DE 100 35 116 A1 1/2002

OTHER PUBLICATIONS

U.S. Appl. No. 11/061,257, filed Feb. 18, 2005, Wenzel et al., Entire Document.
Office Action dated Nov. 16, 2007, for U.S. Appl. No. 11/061,257, filed Feb. 18, 2005, 16 pgs.
Response to the above Office Action submitted to the USPTO on Jan. 22, 2008, 4 pgs.
Office Action dated Jul. 10, for U.S. Appl. No. 11/061,257.

* cited by examiner

*Primary Examiner*—Sam K Ahn
(74) *Attorney, Agent, or Firm*—Eschweiler & Associates, LLC

(57) ABSTRACT

A transmitting/receiving arrangement has a baseband component and a radio-frequency component that are connected via an interface. The interface has a first differential unidirectional data link for transmission of digital transmission data from the baseband component to the radio-frequency component, and a second differential unidirectional data link for transmission of digital received data, which is converted to baseband in the radio-frequency component from the radio-frequency component to the baseband component.

16 Claims, 3 Drawing Sheets

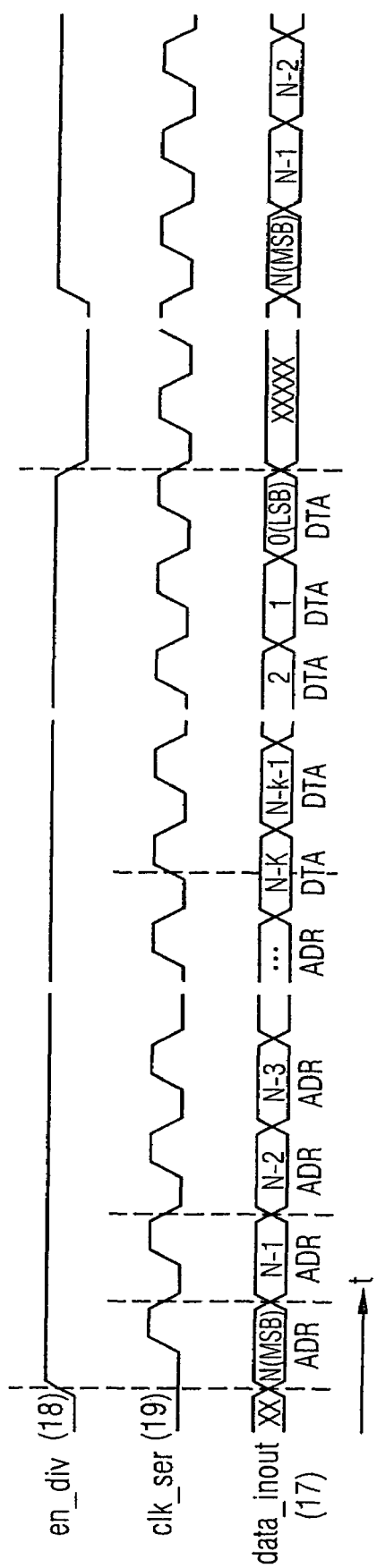

TRANSMITTING AND RECEIVING ARRANGEMENT FOR RADIOS HAVING A BASEBAND COMPONENT, A RADIO-FREQUENCY COMPONENT AND AN INTERFACE ARRANGED IN BETWEEN THEM

REFERENCE TO RELATED APPLICATION

This application claims the benefit of the priority date of German application DE 103 11 701.6, filed on Mar. 17, 2003, the contents of which are herein incorporated by reference in their entirety.

FIELD OF THE INVENTION

The invention relates to a transmitting and receiving arrangement for radios having a baseband component and a radio-frequency component, which are connected via an interface in order to interchange payload data in the transmitting and receiving directions. The invention also relates to a method for transmission of data between the baseband component and the radio-frequency component of a radio designed in this way.

BACKGROUND OF THE INVENTION

Modulators and demodulators are used within transmitting and receiving devices in mobile stations in order to modulate a carrier wave and received data in accordance with the data to be transmitted, and to demodulate the received data in a corresponding manner, in accordance with standardized modulation and demodulation methods. Known modulation and demodulation methods are, for example, GSM (Global System for Mobile Communication), EDGE (Enhanced Data Rates for GSM Evolution), TIA-EIA 136 (Telecommunication Industry Associations/Electronic Industry Association), UTRA FDD ((UMTS-Terrestrial Radio Access Frequency Division Duplex), UTRA TDD (UMTS-Terrestrial Radio Access Time Division Duplex) and IS-95. In general, these modulators and demodulators comprise a baseband component and a radio-frequency component. During transmission, the baseband component makes use of digital signal processing to convert the data which is to be transmitted to a generally complex-value signal which complies with the standard. The signal is converted by the radio-frequency component to a radio frequency, and is transmitted after suitable amplification via an antenna as a real-value signal. In a corresponding manner, during reception, the received payload data is demodulated by the radio-frequency component to form a complex-value signal, and the received demodulated data is processed further in the baseband component.

Since the physical requirements for the baseband and radio-frequency components differ, these functional units are generally produced in separate integrated circuits (radio-frequency chip and baseband chip) using different manufacturing technologies. In the transmitting direction, the modulated baseband signal must be passed in suitable form to the radio-frequency component. In the receiving direction, the demodulated radio-frequency signal must be converted in a suitable form to the baseband signal. A suitable interface must be provided between the baseband component and the radio-frequency component for this purpose.

Currently, the payload data is normally transmitted in analogue form between the radio-frequency component and the baseband component. The payload data signals are in this case normally produced by the analogue interface as complex-value baseband signals, which are subdivided into a real part and an imaginary part (so-called in-phase (I) component and quadrature (Q) component). Both the I component and the Q component are generally transmitted as a differential signal, that is to say at least four lines are required for bidirectional payload data transmission.

This form of signal transmission has the disadvantage that relatively high-quality analogue signal processing components, such as digital/analogue and analogue/digital converters, must be provided both in the baseband component and in the radio-frequency component.

The requirement for the baseband component to be equipped with analogue and digital circuit components as a mixed signal module (hybrid module) in particular increases the price of its development and manufacture. The circuit components that are required for production and transmission of the differential analogue signals in particular occupy a significant proportion of the chip area, even though they are not required for the actual baseband signal processing.

Furthermore, special signal processing steps often have to be carried out in the baseband component in order to compensate for or to correct for inadequacies, non-ideal features or tolerances in the radio-frequency component, in advance. In consequence, the baseband component can no longer be regarded, analyzed and developed independently of the radio-frequency component. As a result of the progress in development in the field of digital signal processing and modulator and demodulator concepts, the proportion of processing in baseband in the overall signal processing path is increasing, particularly with regard to the interaction with the radio-frequency part. This results in an undesirable restriction to the flexibility of baseband components or baseband chips, since the baseband component can only be used together with those radio-frequency assemblies for which they have been especially developed.

German Laid-Open Specification DE 100 35 116 A1 describes a conventional analogue radio-frequency interface for dual-standard baseband chips in mobile radios.

SUMMARY OF THE INVENTION

The invention is based on the object of providing a receiving and transmitting arrangement for radios having a baseband component, a radio-frequency component and an interface arranged between them, and which offers advantageous cost and implementation preconditions in the context of the aspects discussed above. The invention also has the aim of specifying a method for transmission of data between a baseband component and a radio-frequency component having the stated characteristics. One particular aim is to specify an interface that is suitable for high data rates, for example, such as those required in the UTRA FDD, UTRA TDD or IS-95 standards.

Accordingly, one fundamental idea of the invention is to provide a digital interface for the transmission of payload data in the forward direction and in the return direction (that is to say with respect to the digital payload which is to be transmitted from the baseband component to the radio-frequency component and with respect to the received digital payload data from the radio-frequency component to the baseband component), instead of the conventional analogue interface. The digital interface according to the invention has considerably better resistance to disturbances than the analogue interface, which is sensitive to radiated interference. Furthermore, no analogue circuit components are required either for the transmitting signal path or for the receiving signal path in the baseband component. In addition, the invention assists baseband processing in the baseband component independently of the radio-frequency component. A further advantage is that the requirements for design and circuit layout of the baseband component are reduced, since the baseband component can now be designed as a purely digital functional unit.

A further aspect of the invention is that both the first unidirectional data link for transmission of the digital payload data which is to be transmitted from the baseband component to the radio-frequency component and the second unidirectional data link for transmission of the received digital payload data from the radio-frequency component to the baseband component are differential data links. The differential configuration of these two data links allows transmission data which is to be transmitted from the baseband component to the radio-frequency component, and received data to be transmitted from the radio-frequency component to the baseband component, without any interference, thus making it possible to achieve higher data rates.

A further advantage that is achieved by the invention is that the physically separate transmission of transmission data via the first differential unidirectional data link and of received data via the second differential unidirectional data link allows the data interface to be operated in full-duplex mode. This likewise assists the process of achieving high data rates.

In principle, a single word clock line may be sufficient to indicate the start of transmission of a sequence of bits on the first and second data links. According to one advantageous embodiment of the invention, the interface has a first clock line in order to indicate the start of transmission of a sequence of bits on the first data link and a second word clock line in order to indicate the start of transmission of a sequence of bits on the second data link. This improves the flexibility of signal processing in the baseband component and in the radio-frequency component in that, for example, it allows different word lengths for transmission of digital transmission data and for the transmission of digital received data. Furthermore, a situation arises in many transmitting and receiving arrangements in which there is less data (transmission data) that is to be transmitted in one direction (generally from the baseband component to the radio-frequency component) than in the opposite direction (received data). In this case, this measure also makes it possible to increase the data rate.

Since the interface is designed for serial transmission of digital payload data received and to be sent via the data links, this means that the number of lines in the interface can be kept low in a cost-effective manner.

In principle, the bit clock for the payload data (transmission data) which is to be transmitted via the first data link can be produced from the payload data which is to be transmitted itself, and the bit clock for the received digital payload data (received data) which is to be transmitted via the second data link can be produced from the received digital payload data itself. There is therefore no need to provide any bit clock lines for the transmission of the corresponding bit clocks in the interface according to the invention. According to one advantageous aspect of the invention, the interface has a unidirectional system clock line by means of which a system clock that is produced in the radio-frequency component is transmitted to the baseband component. In this case, one advantageous transmitting and receiving arrangement is characterized by a first clock divider means or clock multiplier means in the baseband component, which use the system clock to produce the bit clock for the digital payload data which is to be transmitted via the first data link. Furthermore, in this case, one advantageous transmitting and receiving arrangement is characterized by second clock divider means or clock multiplier means in the baseband component, which uses the system clock to produce the bit clock for the received digital payload data which is transmitted via the second data link.

The interface is preferably designed to transmit data words in the received digital payload data at a rate of $(T_c/2)^{-1}$, with $T_c$ being the chip time duration of the telecommunications standard on which the radio transmission is based. This makes it possible to ensure the real time operation that is required for the interface. In the UMTS standard, $T_c=0.26$ μs.

The interface is preferably designed to transmit data words in the digital payload data at a rate of $T_c^{-1}$ thus also making it possible to comply with the real time requirements.

A further advantageous transmitting and receiving arrangement is characterized in that the interface has a bidirectional data line for serial transmission of configuration data between the radio-frequency component and the baseband component, a bit clock line for transmission of a clock signal with one bit being transmitted via the bidirectional data line in each clock period of the clock signal, and a third word clock line in order to indicate the start of transmission of a sequence of bits on the bidirectional data line. An embodiment of the interface such as this advantageously takes account of the architecture of baseband processing, since it allows payload data and configuration data to be transmitted independently. Configuration data is data which, for example, defines the modulation type, the amplitude, the transmission power profile, the transmission frequency, the transmission time, the transmission duration, the transmitter operating mode, and the transmitter switching-on and off behaviour, etc. In this case, owing to the bidirectional data line for configuration data transmission, a single data line is sufficient to transmit all of the configuration data in both directions between the radio-frequency component and the baseband component, thus keeping the number of interface lines low.

BRIEF DESCRIPTION OF THE DRAWINGS

The invention will be explained in more detail in the following text using an exemplary embodiment and with reference to the drawing, in which:

FIG. 3 shows an illustration of signal profiles of the lines for configuration data transmission.

DETAILED DESCRIPTION OF THE INVENTION

Figure 1:
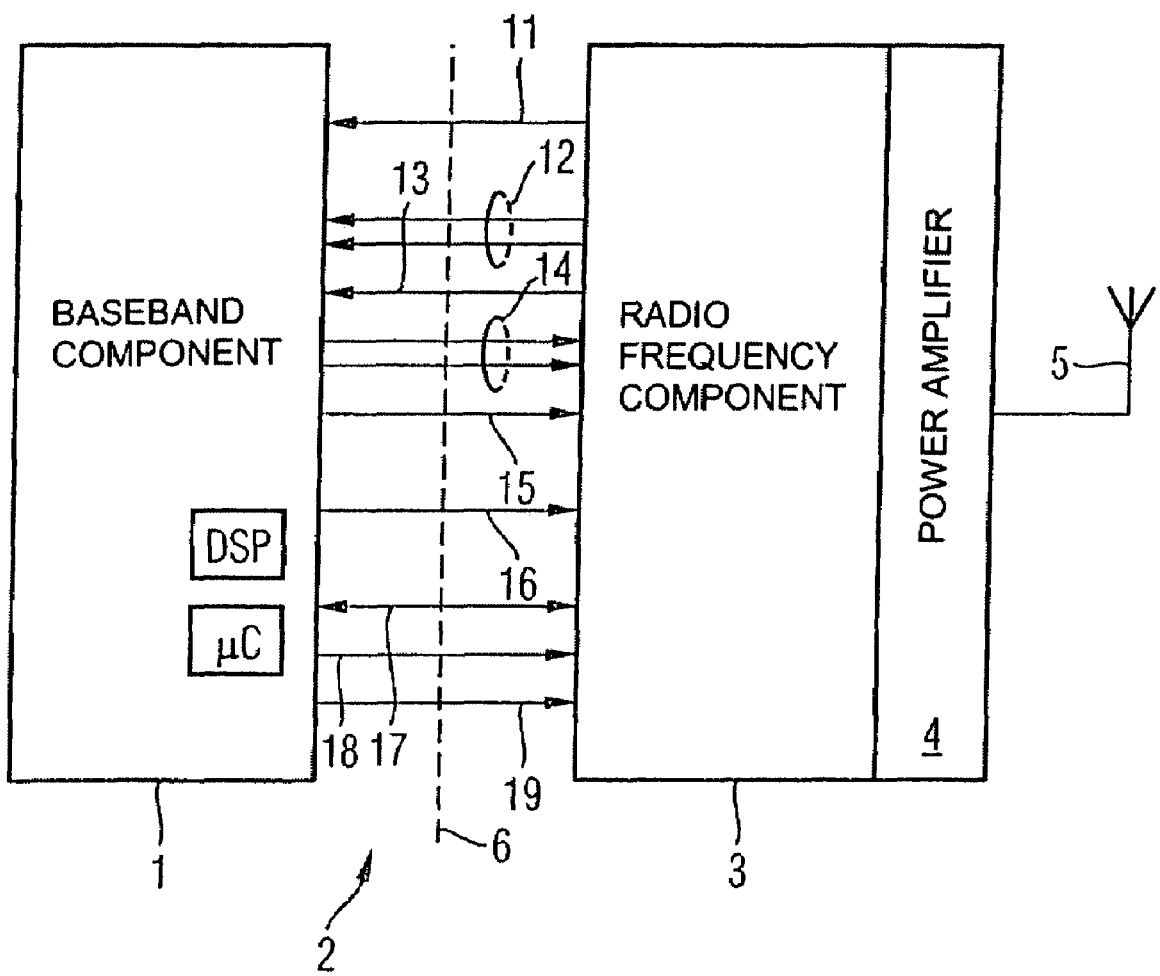
FIG. 1 shows a schematic illustration of the arrangement according to the invention, in the form of a block diagram.

FIG. 1 shows a transmitting and receiving arrangement such as that which is used in a mobile station for a cellular mobile radio network, for example. The arrangement has a baseband component 1, which is connected via a digital interface 2 to a radio-frequency component 3. The radio-frequency component 3 has a power amplifier 4 on the output side, which is connected to an antenna 5.

The baseband component 1 normally has a digital signal processor DSP for processing payload data, as well as a microprocessor μC that processes configuration data and provides sequence control for the entire transmitting and receiving arrangement.

The baseband component 1 carries out baseband processing of the data to be transmitted and of the received data. This comprises signal processing steps at the information bit level (for example GSM) or chip level (for example UMTS), such as the formation of transport blocks, error protection coding, bit rate matching, channel coding (convolutional and/or turbo coding), interleaving, transport stream multiplexing, code division multiplex formation, frame and packet segmentation, etc.

Signal processing steps at the physical level (only parts of layer 1 or of the PHY layer of the OSI reference model) such as pulse forming, modulation, advance correction and compensation, are carried out in the radio-frequency component 3.

The baseband component 1 and the radio-frequency component 3 are generally each in the form of individual integrated circuits. The dashed line 6 indicates the module boundary. The power amplifier 4 may also be in the form of an external component, that is to say it need not be implemented on the radio-frequency chip 3.

The digital interface 2 between the baseband component 1 and the radio-frequency component 3 has two digital multiple conductor connections. A first digital multiple conductor connection, which is associated with the lines 11, 13, 15 and with the double lines 12, 14, is used for transmission of payload data in both directions. The second digital multiple conductor connection, which is associated with the lines 16, 17, 18, 19, is used for transmission of configuration data from the baseband component 1 to the radio-frequency component 3, and it is also possible to transmit data in the opposite direction.

The payload data to be transmitted is transmitted via the double line 14 in differential form from the baseband component 1 to the radio-frequency component 3. The transmission word clock is provided for the radio-frequency component 3 from the baseband component 1 via the transmission word clock line 15. The received digital payload data is transmitted in the opposite direction from the radio-frequency component 3 via the double line 12 to the baseband component 1. The received digital payload data is likewise transmitted in differential form. The received word clock is provided for the baseband component 1 from the radio-frequency component 3 via a received word clock line 13.

The differential transmission of digital data via the double lines 12, 14 takes place in such a way that the mathematical sign of the difference between the two transmitted signal values indicates the value of the transmitted bit: for example, the voltage +A volts is transmitted via one line, and the voltage −A volts is transmitted via the other line, for a bit 1. The difference is +2A volt, that is to say it has a positive mathematical sign. The interchanged voltage values (that is to say −A volts and +A volts) are transmitted via the differential double line 12, 14 for the bit whose value is zero. The difference is −2A volts, and has a negative mathematical sign. The advantage of differential transmission is that radiated interference has no influence on either of the two lines, since it is eliminated during the subtraction of the signal values.

All of the analogue/digital converters and digital/analogue converters for the interface 2 are located in the radio-frequency component 1. Since, in consequence, no analogue components are required for the transmitting path and receiving path in baseband component 1, the baseband component 1 (IC) can be manufactured using simpler, lower-cost manufacturing technologies for exclusively digital circuits.

The received payload data is transmitted to the baseband component 1 via the differential double line 12 immediately after being received by the radio-frequency component 3. Payload data to be transmitted is transmitted from the baseband component 1 to the radio-frequency component 3 via the differential double line 14. This means that less data need be stored in the radio-frequency component 3, since both the payload data to be transmitted and the received payload data can be temporarily stored in the baseband component 1. The immediate transmission of the received payload data from the radio-frequency component to the baseband component 1 means that there is no need for a data memory in the radio-frequency component 3. This provides greater flexibility in the choice of technology for the radio-frequency component 3.

Figure 2:
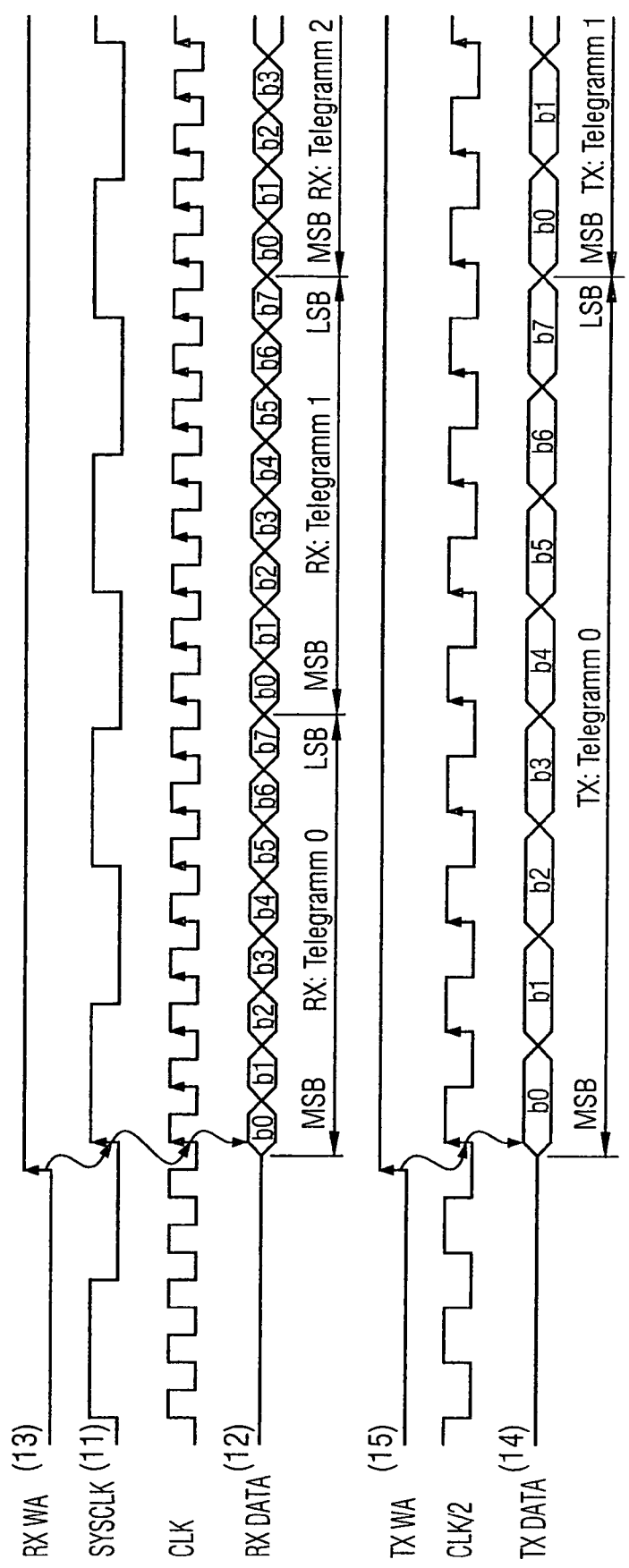
FIG. 2 shows an illustration of signal profiles of the lines for payload data transmission.

FIG. 2 shows the time profile of the signals which are transmitted via the first digital multiple conductor connection 11, 12, 13, 14, 15. The received data word clock signal RX WA is transmitted via the received word clock line 13, the system clock signal SYSCLK is transmitted via the system clock line 11, and the received payload data RX DATA is transmitted via the double line 12. The bit clock CLK for the received payload data may be generated either from the received payload data RX DATA itself or, more easily, by means of clock division or clock multiplication in baseband component 1 from the system clock SYSCLK. In the opposite direction, the radio-frequency component 3 receives the transmission word clock signal TX WA via the transmission word clock line 14, and receives the payload data TX DATA to be transmitted via the double line 14. The bit clock CLK/2 in the radio-frequency component 3 may likewise be generated either from the received data TX DATA or, more simply, by clock division or clock multiplication from the system clock SYSCLK that is produced in the radio-frequency component 3.

The serial transmission of the digital payload data is organized in messages both in the receiving direction and in the transmitting direction. The expression message means a transmission unit that, in the present exemplary embodiment, in each case comprises 8 bits arranged in serial form. The bits in a message are annotated b0, b1, . . . , b7 in FIG. 2. In this case, by way of example, the most significant bit (MSB) b0 is transmitted first, and the least significant bit b7 (LSB) is transmitted last.

One bit of the received payload data RX DATA is clocked into the baseband component 1, and one bit of the payload data TX DATA to be transmitted is clocked into the radio-frequency component 3 in each clock cycle of the periodic bit clock signal CLK or CLK/2. The associated word clock signal RX WA or TX WA defines the start of transmission of messages. Once the word clock signal RX WA or TX WA has occurred, the next clock cycle of the bit clock signal CLK or CLK/2 is used for transmission of the bit b0 in the first message.

In the case of UMTS, by way of example, the 8 bits b0, b1, . . . , b7 for the received payload data RX DATA may each represent one sample value for the real part and imaginary part of a UMTS baseband signal which is sampled at twice the chip rate (7.68 MHz). A lower transmission rate is normally sufficient for the payload data TX DATA to be transmitted. In the present exemplary embodiment, the real and imaginary parts of the complex chip transmission values are transmitted with a maximum word length of 8 bits at the chip clock rate. The bit clock rate CLK/2 that is required for this purpose need therefore be only half as high as the bit clock rate CLK in the receiving signal path.

As already mentioned, the configuration information is transmitted via the separate multiple conductor connection, which comprises the lines 16, 17, 18, 19. Digital configuration data is transmitted via the bidirectional line 17. The word clock line 18 and the bit clock line 19 supply the word clock and the bit clock, respectively, to the radio-frequency component 3 from the baseband component 1. The unidirectional line 16 is an optional activation line, by means of which the baseband component 1 can activate or deactivate the radio-frequency component 3.

FIG. 3 shows the time profile of the word clock signal en_div that is transmitted via the word clock line 18, the time profile of the clock signal clk_ser that is transmitted via the bit clock line 19, and the time profile of the configuration data data_inout that is transmitted via the bidirectional line 17. The protocol for configuration data transmission is once again organized in messages, and these may be individual messages or else a group of immediately successive messages. One message comprises a defined number of N+1 bits, for example 24 bits, and is composed of an address part ADR and a data part DTA. The address part has K bits, and the remaining N−K+1 bits belong to the data part. The address determines the destination component to which the configuration data is intended to be transferred in the radio-frequency component 3.

In the case of a group of messages used for transmitting configuration data to two or more destination components with successive addresses, the address part ADR may be omitted if the receiver knows the initial address. A specific configuration message may be used for the transmission of a group of messages. Before the start of the transmission of the group of messages, the configuration message defines the start, the length and the start destination address of the group of messages. A group of messages is used, for example, to set the basic configuration of the transmitter in a time-efficient manner.

When transmitting individual messages, the time of message transmission generally also determines the time at which the new setting becomes effective.

The bidirectional data line 17 can also be used to transmit data (which has previously been requested by the baseband component 1 via a specific request message) from the radio-frequency component 3 to the baseband component 1. This request message may, for example, be characterized in that one bit in the address part is used to indicate that this is intended to be a read access rather than a write access to that address. However, this is not illustrated in FIG. 3.

It is evident from the above statements that the completely digital serial interface according to the invention allows sufficiently fast, interference-proof and simple payload data and configuration data transmission between the baseband component 1 and the radio-frequency component 3, particularly for high-rate third-generation mobile radio applications.

The invention claimed is:

1. A transmitting and receiving arrangement for a mobile radio having a baseband component and a radio-frequency component that are connected via an interface in order to interchange payload data in the transmitting and receiving directions, the interface comprising:
   a first differential unidirectional data link for transmission of digital payload data that is to be transmitted from the baseband component to the radio-frequency component of the mobile radio;
   a second differential unidirectional data link for transmission of received payload data that is converted to baseband in the radio-frequency component and of digitized, received digital payload data from the radio-frequency component to the baseband component of the mobile radio;
   a first word clock line operable to indicate a start of transmission of a sequence of bits on the first data link; and
   a second word clock line operable to indicate a start of transmission of a sequence of bits on the second data link;
   wherein the baseband component and the radio-frequency component are implemented in different integrated circuits.

2. The transmitting and receiving arrangement according to claim 1, wherein the interface is configured for serial transmission of received digital payload data and of digital payload data that is to be transmitted via the data links.

3. The transmitting and receiving arrangement according to claim 1, wherein the interface further comprises:
   a unidirectional system clock line configured to transmit a system clock signal produced in the radio-frequency component to the baseband component.

4. The transmitting and receiving arrangement according to claim 1, wherein the interface is configured to transmit data words in the received digital payload data with a word length of 8 bits.

5. The transmitting and receiving arrangement according to claim 1, wherein the interface is configured to transmit data words in the digital payload data which is to be transmitted with a word length of 8 bits.

6. The transmitting and receiving arrangement according to claim 1, wherein the interface further comprises a unidirectional activation line for activation of the radio-frequency component by the baseband component.

7. A transmitting and receiving arrangement for a mobile radio having a baseband component and a radio-frequency component that are connected via an interface in order to interchange payload data in the transmitting and receiving directions, the interface comprising:
   a first differential unidirectional data link for transmission of digital payload data that is to be transmitted from the baseband component to the radio-frequency component of the mobile radio;
   a second differential unidirectional data link for transmission of received payload data that is converted to baseband in the radio-frequency component and of digitized, received digital payload data from the radio-frequency component to the baseband component of the mobile radio;
   a unidirectional system clock line configured to transmit a system clock signal produced in the radio-frequency component to the baseband component; and
   a first clock divider or clock multiplier in the baseband component that uses the system clock signal to produce a bit clock for the digital payload data that is to be transmitted from the baseband component to the radio-frequency component via the first data link;
   or,
   a second clock divider or clock multiplier in the baseband component that uses the system clock signal to produce a bit clock for the received digital payload data that is to be transmitted from the radio-frequency component to the baseband component via the second data link.

8. A transmitting and receiving arrangement for a mobile radio having a baseband component and a radio-frequency component that are connected via an interface in order to interchange payload data in the transmitting and receiving directions, the interface comprising:
   a first differential unidirectional data link for transmission of digital payload data that is to be transmitted from the baseband component to the radio-frequency component of the mobile radio; and
   a second differential unidirectional data link for transmission of received payload data that is converted to baseband in the radio-frequency component and of digitized, received digital payload data from the radio-frequency component to the baseband component of the mobile radio;
   wherein the interface is configured to transmit data words in the received digital payload data from the radio-frequency component to the baseband component at a rate of $(T_c/2)^{-1}$, with $T_c$ being a chip time duration associated with a telecommunications standard on which a radio transmission is based;

or, wherein the interface is configured to transmit data words in the digital payload data that is to be transmitted from the baseband component to the radio-frequency component at a rate of $T_c^{-1}$, with $T_c$ being a chip time duration associated with a telecommunications standard on which the radio transmission is based.

9. A method for transmission of data between a baseband component and a radio-frequency component in a transmitting and receiving arrangement for a mobile radio, comprising:

transmitting digital payload data that is to be transmitted via a first differential unidirectional data link from the baseband component to the radio-frequency component of the mobile radio;

transmitting received digital payload data which is converted to baseband in the radio-frequency component and digitized received digital data via a second differential unidirectional data link from the radio-frequency component to the baseband component of the mobile radio;

indicating a start of transmission of a sequence of bits on the first data link via a first word clock line;

indicating a start of transmission of a sequence of bits on the second data link via a second word clock line; and wherein the baseband component and the radio-frequency component are implemented in different integrated circuits.

10. The method according to claim 9, further comprising:

transmitting first word clock control information via a first word clock line from the baseband component to the radio-frequency component in order to indicate a start of transmission of a sequence of bits on the first data link; and transmitting second word clock control information via a second word clock line from the radio-frequency component to the baseband component in order to indicate a start of transmission of a sequence of bits on the second data link.

11. The method according to claim 9, wherein the received digital payload data and the digital payload data that is to be transmitted is transmitted in serial form via the data links.

12. The method according to claim 9, further comprising:

generating a system clock signal in the radio-frequency component; and transmitting the system clock signal via a unidirectional system clock line to the baseband component.

13. The method according to claim 9, wherein data words with a word length of 8 bits are used for transmission of the received digital payload data.

14. The method according to claim 9, wherein data words with a word length of 8 bits are used for transmission of the digital payload data to be transmitted.

15. A method for transmission of data between a baseband component and a radio-frequency component in a transmitting and receiving arrangement for a mobile radio, comprising:

transmitting digital payload data that is to be transmitted via a first differential unidirectional data link from the baseband component to the radio-frequency component of the mobile radio;

transmitting received digital payload data which is converted to baseband in the radio-frequency component and digitized received digital data via a second differential unidirectional data link from the radio-frequency component to the baseband component of the mobile radio;

generating a system clock signal in the radio-frequency component;

transmitting the system clock signal via a unidirectional system clock line to the baseband component; and generating in the baseband component from the system clock signal that is received via the unidirectional system clock line a bit clock for the digital payload data that is to be transmitted and that is transmitted via the first data link;

or, generating in the baseband component from the system clock signal that is received via the unidirectional system clock line a bit clock for the received digital payload data that is transmitted via the second data link.

16. A method for transmission of data between a baseband component and a radio-frequency component in a transmitting and receiving arrangement for a mobile radio, comprising:

transmitting digital payload data that is to be transmitted via a first differential unidirectional data link from the baseband component to the radio-frequency component of the mobile radio; and transmitting received digital payload data which is converted to baseband in the radio-frequency component and digitized received digital data via a second differential unidirectional data link from the radio-frequency component to the baseband component of the mobile radio;

wherein data words in the received digital payload data are transmitted at a rate of $(T_c/2)^{-1}$, with $T_c$ being a chip time duration associated with a telecommunications standard on which a radio transmission is based;

or, wherein data words in the digital payload data that is to be transmitted are transmitted at a rate of $T_c^{-1}$, with $T_c$ being a chip time duration associated with a telecommunications standard on which a radio transmission is based.

* * * * *